US008305597B2

(12) United States Patent
Sato

(10) Patent No.: US 8,305,597 B2
(45) Date of Patent: Nov. 6, 2012

(54) IMAGE RECOGNITION DEVICE, COPY APPARATUS AND IMAGE RECOGNITION METHOD

(75) Inventor: Yuji Sato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1396 days.

(21) Appl. No.: 11/860,838

(22) Filed: Sep. 25, 2007

(65) Prior Publication Data

US 2008/0080018 A1   Apr. 3, 2008

(30) Foreign Application Priority Data

Sep. 28, 2006  (JP) ................................. 2006-263970

(51) Int. Cl.
*H04N 1/04* (2006.01)
(52) U.S. Cl. .......................... 358/1.14; 358/1.9; 358/452
(58) Field of Classification Search ................. 358/1.14, 358/464, 452; 382/218; 345/658
See application file for complete search history.

(56) References Cited

U.S. PATENT DOCUMENTS

| 5,751,854 A * | 5/1998 | Saitoh et al. ................... 382/218 |
| 6,928,190 B2 * | 8/2005 | Namikata ....................... 382/218 |
| 2010/0092089 A1 * | 4/2010 | Meiring et al. ................ 382/184 |

FOREIGN PATENT DOCUMENTS

| JP | 59-109977 | 6/1984 |
| JP | 06-070155 | 3/1994 |
| JP | 08-263717 | 10/1996 |
| JP | 09-265534 | 10/1997 |
| JP | 2000-222614 | 8/2000 |
| JP | 2001-273541 | 10/2001 |
| JP | 2002-077609 | 3/2002 |

OTHER PUBLICATIONS

Notification of Reasons for Refusal for Japanese patent application No. 2006-263970 mailed Apr. 19, 2011.

* cited by examiner

*Primary Examiner* — King Poon
*Assistant Examiner* — Iriana Cruz
(74) *Attorney, Agent, or Firm* — Banner & Witcoff, Ltd.

(57) ABSTRACT

An image recognition device of the invention includes an image reading means for reading image information from a manuscript, discriminating a specific mark in which plural marks are arranged from image information. The image recognition device includes an extraction means for extracting marks included in the image information, a distance calculating means for calculating distances between marks, and a discrimination means for determining that there is a specific mark in image information when distance between the marks correspond to distances between marks of the specific mark as well as there is not a mirror-image relationship between positions of marks and the specific mark.

12 Claims, 19 Drawing Sheets

| NUMBER | X-COORDINATE | Y-COORDINATE | DETECTED POINT |
|---|---|---|---|
| 1 | 3 | 6 | M3 |
| 2 | 7 | 4 | M6 |
| 3 | 10 | 2 | M2 |
| 4 | 9 | 3 | M4 |
| 5 | 11 | 3 | M5 |
| 6 | 9 | 4 | M7 |
| 7 | 6 | 5 | M9 |
| 8 | 7 | 7 | M10 |
| 9 | 11 | 7 | M11 |
| 10 | | | |
| 11 | | | |
| 12 | | | |
| 13 | | | |
| 14 | | | |
| 15 | | | |
| 16 | | | |

Fig. 5C $$P = (Y2 - Y1) \times (X3 - X1) - (Y3 - Y1) \times (X2 - X1) \cdots \text{FORMULA 1}$$
※ P:MIRROR-IMAGE DETERMINATION VALUE $$Pm = (Y2m-Y1m) \times (X3m-X1m) - (Y3m-Y1m) \times (X2m-X1m) \cdots \text{FORMULA 2}$$
※ Pm:MIRROR-IMAGE DETERMINATION VALUE $$P = -Pm \cdots \text{FORMULA 3}$$

IMAGE RECOGNITION DEVICE, COPY APPARATUS AND IMAGE RECOGNITION METHOD

CROSS-REFERENCE TO RELATED APPLICATION

The present application alleges benefits related to Japanese Patent Application JP2006-263970 filed in the Japanese Patent Office on Sep. 28, 2006, the contents of which being incorporated herein by reference.

BACKGROUND OF THE INVENTION

The invention relates to an image recognition device, a copy apparatus and an image recognition method.

A conventional image recognition device is disclosed in JP-A-2002-77609. The image recognition device includes an image reading means for reading image information from a manuscript, discriminating a specific mark in which plural marks are arranged from the image information.

In more detail, the image recognition device includes an extraction means for extracting marks included in image information, a distance calculating means for calculating distances between marks and a discrimination means for determining that there is the specific mark in image information when distances between marks correspond to distances between marks of the specific mark.

The conventional image recognition device having the above configuration is mounted on, for example, a copy apparatus including a printing means for performing printing based on image information. The image recognition device can take illegal copy prevention measures such as stopping printing processing after that when determining that there is a specific mark in image information. Accordingly, the image recognition device discriminates the specific mark included in a manuscript such as a banknote or a classified document to prevent illegal copying.

In order to prevent the copy apparatus from being misused for illegal copying of a banknote or a classified document, it is required that determination accuracy of the image recognition device is improved.

BRIEF SUMMARY OF THE INVENTION

The invention has been made in view of the above conventional conditions, and an object thereof is to provide an image recognition device which is capable of improving determination accuracy of image recognition.

In order to achieve the above object, the inventor performed analyses in detail of the conventional image recognition device and found problems below.

Specifically, the above conventional image recognition device merely calculates distances between extracted marks, and simply determines that there is a specific mark in image information when distances between marks correspond to distances between marks of the specific mark.

In the image recognition device, distances between marks correspond to distances between marks of the specific mark even when there is a mirror-image relationship between positions of extracted marks and the specific mark, therefore, the image recognition device mistakenly determines that there is the specific mark in image information.

In order to solve the above problem, an inventor devoted himself to study and reached the present invention.

An image recognition device of the invention includes an image reading means for reading image information from a manuscript, discriminating a specific mark in which plural marks are arranged in image information. The image recognition device includes an extraction means for extracting marks included in image information, a distance calculating means for calculating distances between marks and a discrimination means for determining that there is a specific mark in image information when distances between marks correspond to distances between marks of the specific mark and when there is not a mirror-image relationship between positions of marks and the specific mark.

In the image recognition device of the invention having the above configuration, the discrimination means determines whether distances between marks correspond to distances between marks of the specific mark or not, as well as determines whether there is a mirror-image relationship between positions of extracted marks and the specific mark.

Accordingly, the discrimination means determines that there is the specific mark in image information when distances between marks correspond to distances between marks of the specific mark as well as when there is not a mirror-relation between positions of extracted marks and the specific mark. On the other hand, the discrimination means determines that there is not the specific mark in image information when distances between marks do not correspond to distances between marks of the specific mark. Moreover, the discrimination means determines that there is not the specific mark when there is a mirror-image relationship between extracted marks and the specific mark through distances between marks correspond to distances between marks of the specific mark.

Accordingly, a situation that the image recognition device mistakenly determines that there is a specific mark in image information rarely occurs, and mistaken determination can be reduced, comparing with the conventional image recognition device which merely compares distances between marks to distances between marks of the specific mark.

Therefore, the image recognition device of the invention can improve determination accuracy of the image recognition.

BRIEF DESCRIPTION OF THE DRAWINGS

Hereinafter, embodiments in which the present invention is embodied will be explained with reference to the drawing.

FIG. 5A to FIG. 5C relate to the image recognition device according to the embodiment, which show explanatory views showing a method of determining a mirror-image by a discrimination means.

DETAILED DESCRIPTION OF THE PREFERRED EMBODIMENTS

Figure 1:
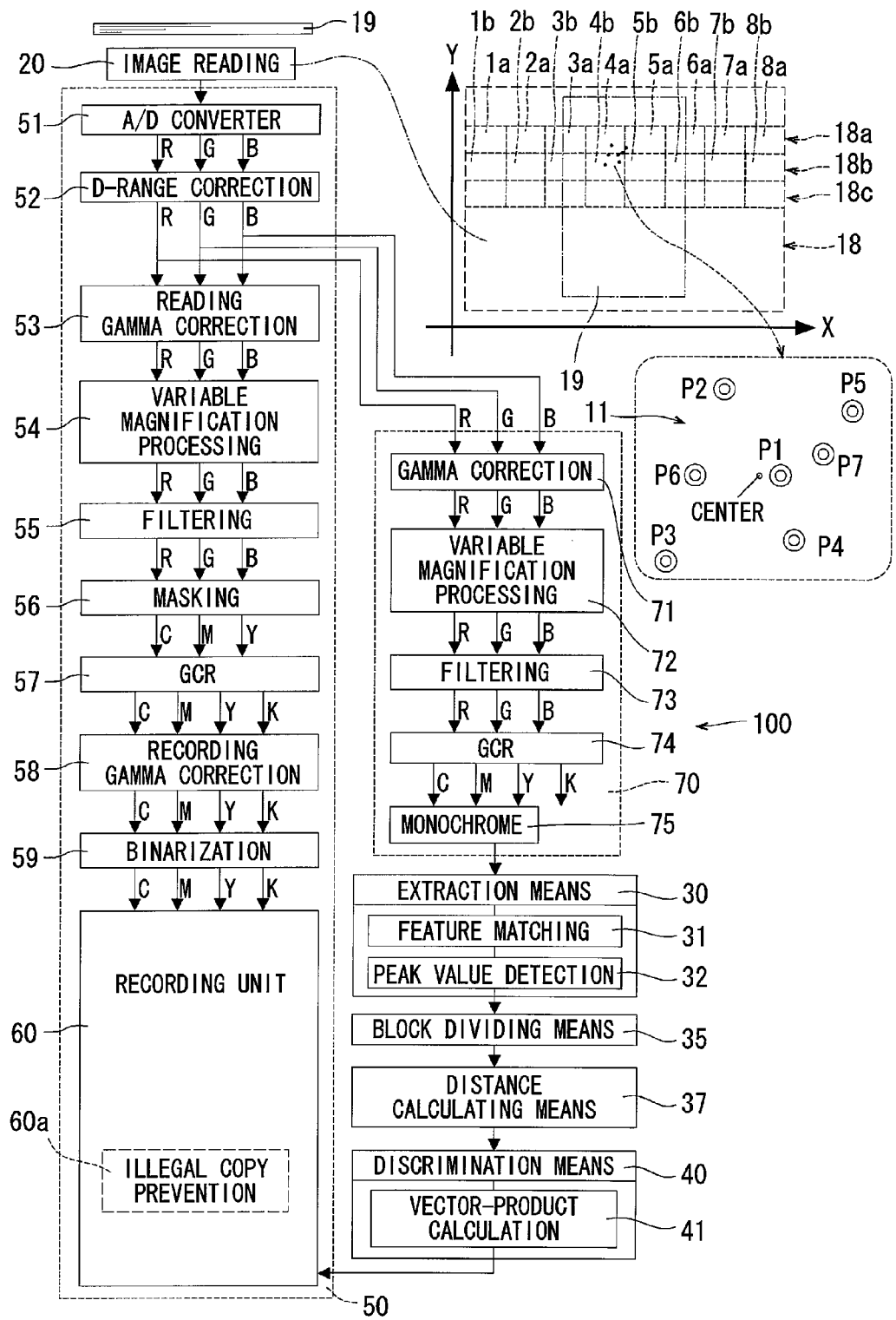
FIG. 1 is an explanatory diagram showing a configuration of an image recognition device according to an embodiment.

As shown in FIG. 1, an image recognition device 100 according to an embodiment is mounted on a copy apparatus (not shown) such as a printer, a copy machine, a FAX and the like. The image recognition device 100 includes an image reading means 20 for reading image information 18 from a manuscript 19 and a first image processing means 50 for correcting the image information 18 so as to correspond to a reading characteristic of the image reading means 20, an output characteristic of a copy apparatus, or an output form such as an output size or a variable magnification rate of copying designated by a user.

The image recognition device 100 includes a second image processing means 70, an extraction means 30, a block dividing means 35, a distance calculating means 37, a discrimination means 40. The second image processing means 70, the extraction means 30, the block dividing means 35, the distance calculating means 37, the discrimination means 40 discriminates whether there is a specific mark 11 in image information 18 or not by a later-described procedure.

The specific mark 11 exists in the image information 18 obtained by the reading means 20 reading a manuscript 19 such as a banknote of a classified document. In the embodiment, the specific image 11 has seven marks P1, P2, P3, P4, P5, P6, and P7 arranged in a predetermined position relation. Respective marks P1, P2, P3, P4, P5, P6, and P7 are marks "◉" having the same shape, the color of which is also chromatic color so as not to be misidentified as character information.

Hereinafter, configurations of the image reading means 20, the first image processing means 50, the second image processing means 70, the extraction means 30, the block dividing means 35, the distance calculating means 37, the discrimination means 40 will be explained in more detail.

(Image Reading Means)

The image reading means 20 is a scanner reading the manuscript 19 in a main-scanning direction as well as reading image information 18 of the manuscript 19 which relatively moves in a sub-scanning direction. The image reading means 20 may have any configuration as long as the means is capable of reading the image information 18 from the manuscript 19.

(First Image Processing Means)

The first image processing means 50 is provided in the downstream of the image reading means 20, including, in order from the upstream, an A/D converter 51, a D-range correction unit 52, a reading gamma correction unit 53, a variable magnification processing unit 54, a filtering unit 55, a masking unit 56, a GCR unit 57, a recording gamma correction unit 58, a binarization unit 59 and a recording unit 60. The first image processing means 50 is not limited to the above configuration.

The A/D converter 51 converts the image information 18 read by the image reading means 20 from analog signals to digital data. At this time, the signals are converted into digital data by dividing data into RGB (R: red, G: green, B: blue).

The D-range correction unit 52 corrects the unevenness of luminance of a light source included in the image reading means 20 or the unevenness of dynamic ranges according to pixels occurring from the unevenness of sensitivity of a sensor.

The reading gamma correction unit 53 corrects contrast linearity of the image reading means 20.

The variable magnification processing unit 54 performs variable magnification processing which enlarges or reduces the image information 18 in order to adjust the difference between resolutions of the image reading means 20 and the recording unit 60 or in order to allow the variable magnification rate of copying to be a rate designated by the user.

The filtering unit 55 performs smoothing filtering processing for removing noise of the image information 18 or enhanced filtering processing for improving accuracy of characters.

The masking unit 56 converts the difference of color spaces between the image reading means 20 and the recording unit 60 (converting from RGB into CMY (C: cyan, M: magenta, Y: yellow). Recently, a method using a three-dimensional lookup table is commonly used.

The GCR unit 57 generates a black component from input CMY as well as removes the black component from CMY. Namely, CMY data is converted into CMYK (K: black) data.

The recording gamma correcting unit 58 corrects density linearity because of dot gain and the like of the recording unit 60.

The binarization unit 59 converts data into binary data which can be recorded in the recording unit 60 by an error diffusion method or a dither method.

The recording unit 60 records the image information 18 which has been corrected by the above A/D converter 51, the D-range correction unit 52, the reading gamma correction unit 53, the variable magnification processing unit 54, the filtering unit 55, the masking unit 56, the GCR unit 57, the recording gamma correction unit 58, and the binarization unit 59, and outputs the image information 18 to the copy apparatus and the like. The recording unit 60 includes an illegal copy prevention unit 60a performing illegal copy prevention measures such as stopping output of the image information 18 to the outside, when it is determined that there is the specific mark 11 in the image information 18.

(Second Image Processing Means)

The second image processing means 70 is provided in the downstream of the position of the D-range correction unit 52 of the first image processing means 50 and parallel to the position from the reading gamma correction unit 53 until the recording unit 60 in the first image processing means 50. The second image processing means 70 includes, in order from the upstream, a gamma correction unit 71, a variable magnification processing unit 72, a filtering unit 73, a GCR unit 74 and a monochrome unit 75.

The gamma correction unit 71 receives image information 18 in which dynamic ranges have been corrected by the A/D converter 51 and the D-range correction unit 52 in the first image processing means 50. The gamma correction unit 71 corrects contrast linearity of the reading means 20 so as to be suitable for discrimination processing of the specific mark 11. Particularly, dark portions and highlight portions are not necessary for discrimination processing of the specific mark 11, therefore, a high-contrast tone curve is used.

The magnification processing unit 72 performs variable magnification processing from the resolution of the reading means 20 to the resolution suitable for discrimination processing of the specific mark 11. The variable magnification rate at this time does not depend on the variable magnification rate of copying designated by the user.

The filtering unit 73 performs filtering processing for removing noise of the image information 18 and for improving accuracy of characters. In the embodiment, since edge information is not used to discrimination processing of the specific mark 11, the smoothing filtering processing for removing noise is performed with respect to the image information 18.

The GCR unit 74 generates a black component from input CMY as well as removes the black component from CMY. Namely, CMY data is converted into CMYK data.

The monochrome unit 75 receives only CMY data from the GCR unit 74, in which the black component is removed from the CMYK data. This is because the marks P1 to P7 included in the specific mark 11 have a chromatic color so as not to be misidentified as character information. Then, the monochrome unit 75 allows the CMY data to be monochrome.

(Extraction Means)

The extraction means 30 is provided in the downstream of the second image processing means 70, including a feature matching unit 31 and a peak value detecting unit 32. The extraction means 30 selects marks that seem to resemble marks P1 to P7 of the specific mark 11 in the image information 18, and checks the selected marks with the shape of the marks P1 to P7 by the feature matching unit 31 to calculate similarities by finding correlation coefficients. Then, the peak value detecting unit 32 detects coordinates to be a peak value locally at more than a fixed value among the calculated similarities as a detection point of the extracted mark.

Figure 2A:
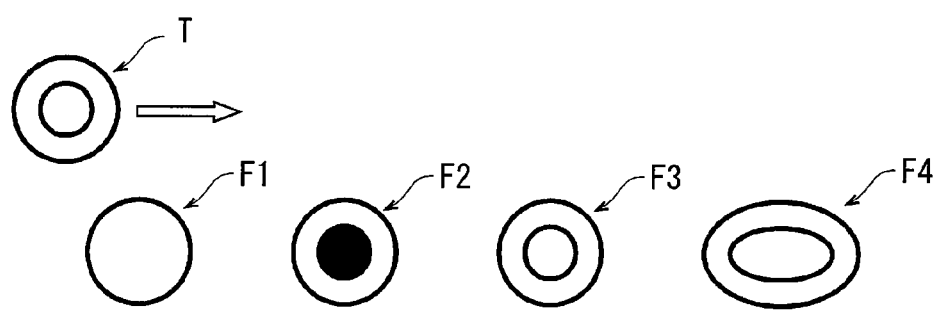
FIG. 2A and FIG. 2B relates to the image recognition device according to the embodiment, which is an explanatory view showing a processing method of an extraction means.

The above processing by the extraction means 30 will be explained in more detail by using FIG. 2A. In the extraction means 30, for example, assume that there are marks F1, F2, F3, and F4 which seem to resemble marks P1 to P7 in image information 18. The feature matching unit 31 overlaps a reference mark "T" having the same shape as marks P1 to P7 with marks F1, F2, F3 and F4 while shifting a relative position. Then, the feature matching unit 31 checks the reference mark "T" with marks F1, F2, F3 and F4 and find correlation coefficients to calculate similarities.

Figure 2B:
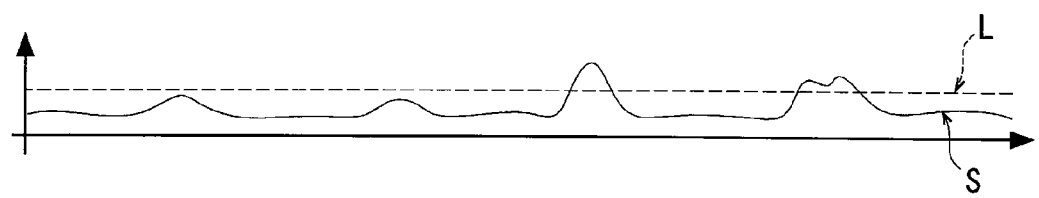

At this time, the similarity varies by a graph shown by FIG. 2B (shown by a curve "S"). When marks F1 and F2 having different shapes from marks P1 to P7 are checked with the reference mark "T", the similarity does not become too high and does not exceed a line "L" as a fixed value. As a result, the feature matching unit 31 excludes the marks F1 and F2.

On the other hand, when the mark F3 having the same shape as the marks P1 to P7 is checked with the reference mark "T", the similarity becomes high as deviation between both marks becomes small and exceeds the line "L" as the fixed value. Then, when there is no deviation between both marks, a peak value appears. At this time, the peak value detecting unit 32 detects coordinates to be the peak value as a detected point.

In the case that the mark F4 as a result that marks P1 to P7 were read distortedly due to error and the like of the image reading means 20 is checked with the reference mark "T", the similarity becomes high as deviation of both marks becomes small and exceeds the line "L" as the fixed value, however, the deviation between the both marks does not disappear completely. In this case, there is a case that two peak values which are lower than the peak value of the mark F3 appear. At this time, the peak value detecting unit 32 is likely to detect coordinates to be the two peak values separately as detected points, and in that case, two detected points are detected from the mark F4. However, in the image recognition device 100, Steps S171 to S182 of the discrimination means 40 which will be described later solve this problem and prevent determination from being omitted.

The extraction means 30 performs the above processing over the whole range of the image information 18, and when the similarity which becomes the peak value locally at more than the fixed value is detected, determined that there is a mark having the same shape as the marks P1 to P7 in the image information 18 and extracts the mark. Then, detected points M1, . . . , Mn ("n" denotes the total number of extracted marks) showing coordinates of extracted marks are detected.

(Block Dividing Means)

The block dividing means 35 is provided in the downstream of the extraction means 30. The block dividing means 35 divides image information 18 in many blocks along a sub-scanning direction (Y direction) and extracts belt-shaped extraction regions 18a and 18b along a main-scanning direction sequentially as shown in FIG. 1. The block dividing means 35 divides the extraction regions 18a and 18b into eight respectively along the main-scanning direction. Accordingly, the block dividing means 35 divides the extraction regions 18a, 18b into 8×2 blocks 1a to 8a, 1b to 8b. The dividing number in the main-scanning direction is eight for convenience for easy explanation, however, any dividing number can be applied.

The block dividing means 35, after completing the processing of the extraction regions 18a and 18b, repeats the above block dividing with respect to extraction regions 18b and 18c. The block dividing means 35 divides regions into blocks while forming overlapping portions in the sub-scanning direction in this manner, accordingly, the block dividing means 35 solves the problem that the specific mark 11 existing in the image information 18 is divided in the sub-scanning direction to disable the specific mark 11 to be discriminated.

Figure 3A:
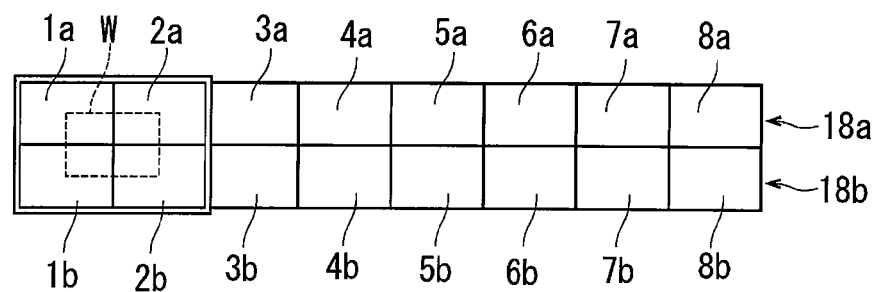
FIG. 3A to FIG. 3D relate to the image recognition device according to the embodiment, which are explanatory views showing a processing method of a block dividing means.
Figure 3B:
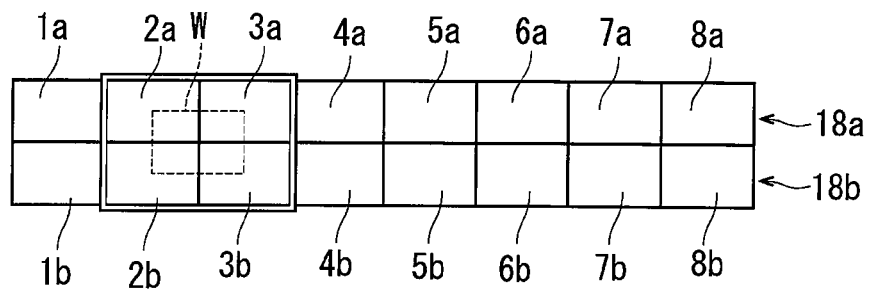
Figure 3C:
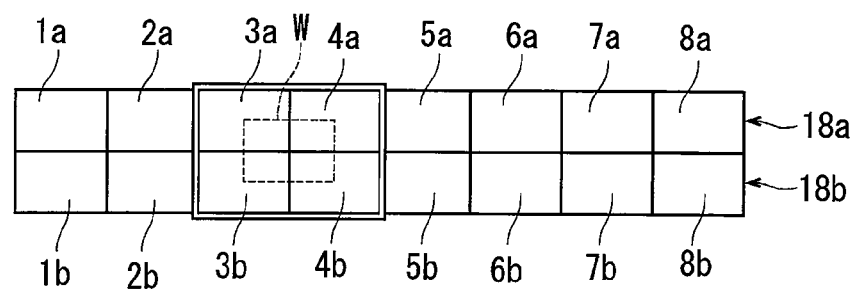
Figure 3D:
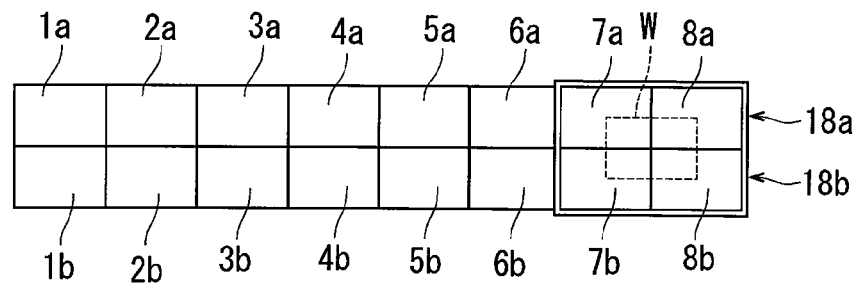

The block dividing means 35 selects 2×2 blocks 1a, 2a, 1b and 2b from 8×2 blocks 1a to 8a, 1b to 8b as shown in FIG. 3A. Next, 2×2 blocks 2a, 3a, 2b and 3b are selected as shown in FIG. 3B, next, 2×2 blocks 3a, 4a, 3b and 4b are selected as shown in FIG. 3C, then, finally, 2×2 blocks 7a, 8a, 7b and 8b are selected as shown in FIG. 3D. The block dividing means 35 forms overlapping portions in the main-scanning direction in this manner, accordingly, the block dividing means 35 solves the problem that the specific mark 11 existing in the image information 18 is divided in the main-scanning direction to disable the specific mark 11 to be discriminated.

As described above, the block dividing means 35 divides the extracted detected points M1 to Mn into respective blocks to prevent information amount processed by the distance calculating means 37 and the discrimination means 40 at a time from being too large.

(Distance Calculating Means)

The distance calculating means 37 is provided in the downstream of the block dividing means 35. The distance calculating means 37 calculates distances between marks extracted in the 2×2 blocks sequentially selected by the block dividing means 35.

Figure 4:
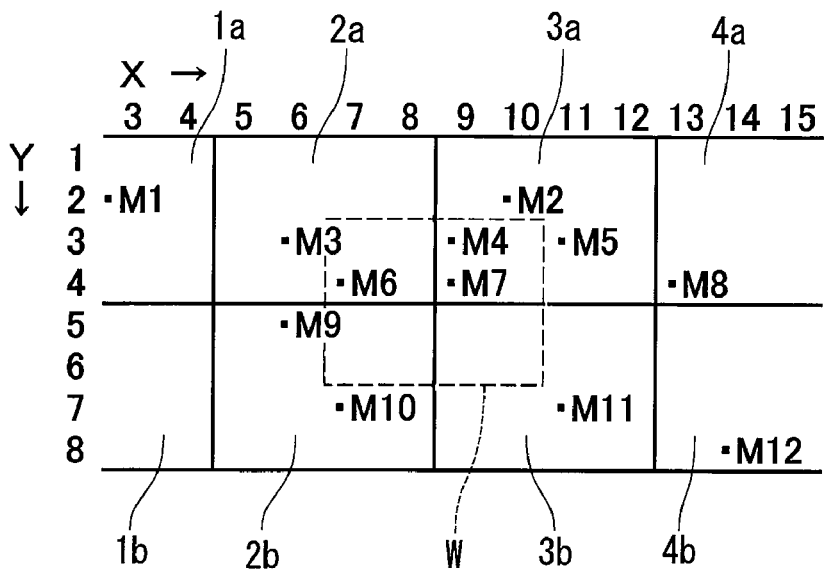
FIG. 4 relates to the image recognition device according to the embodiment, which is an explanatory view showing detected points to be processed by a distance calculating means.

As a specific example, as shown in FIG. 4, when detected points M2 to M11 exist in 2×2 blocks 2a, 3a, 2b and 3b selected by the block dividing means 35, the distance calculating means 37 calculates distances between detected points M2 to M11 based on coordinates of detected points M2 to M11. The calculated results are distances between detected marks.

In the case that a detection point selected from the detected points M2 to M11 as a first detection point P1 by a later-described discrimination means 40 is not in a center frame "W" shown in FIG. 4, the distance calculating means 37 does not perform processing in the region. Because the center frame "W" moves closely every time 2×2 blocks are selected by the block dividing means 35 as shown in FIG. 3A to FIG. 3D. Therefore, even when the detection point selected from the detected points M2 to M11 as the first detection point P1 is not in the center frame "W" shown in FIG. 4, the detection point will be in the center frame "W" at a next block selection by the block dividing means 35. Accordingly, the distance calculating means 37 can omit repeated processing.

(Discrimination Means)

The discrimination means 40 is provided in the downstream of the calculating means 37. The discrimination means 40 determines whether distances between the calculated marks by the distance calculating means 37 correspond to distances between the marks P1 to P7 of the specified mark 11.

The discrimination means 40 includes a vector-product calculating means 41. The vector-product calculating means 41 calculates a vector product using two vectors directed from a first vector optionally selected to a second vector optionally selected and to a third vector optionally selected. When the vector product calculated by the vector-product calculating means 41 correspond to a vector product "P" of the specific mark 11, the discrimination means 40 determines that there is not a mirror-image relationship between positions of marks and the specific mark 11.

Figure 5A:
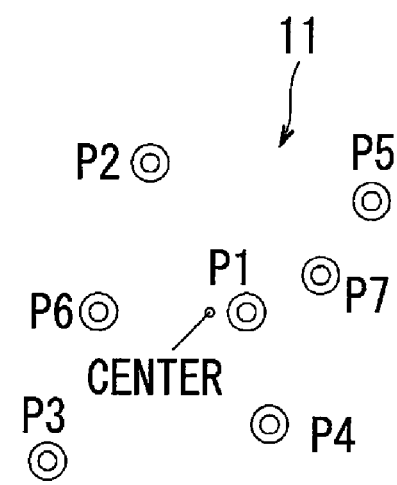
Figure 5A:
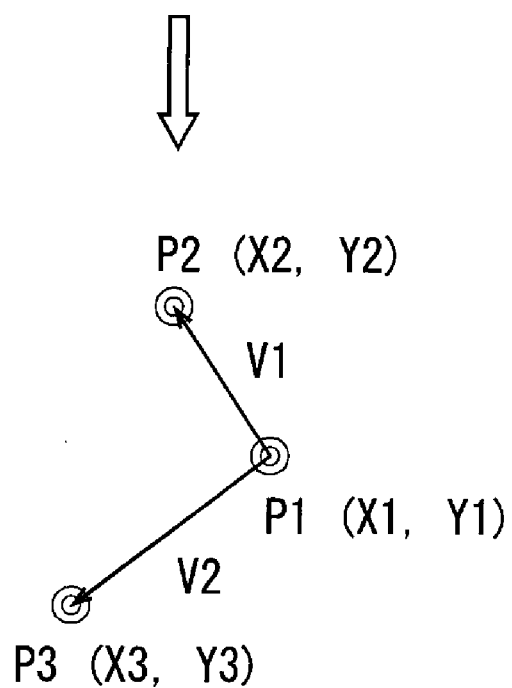
Figure 5B:
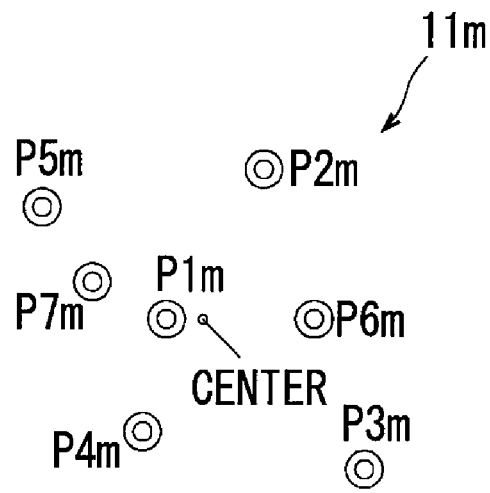
Figure 5B:
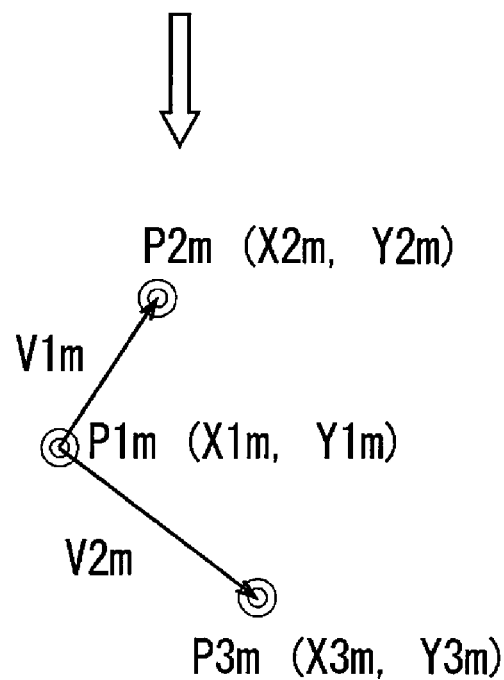

A specific example will be explained by using the specific mark 11 and a mirror-image mark 11m having a mirror-image relationship with the specific mark 11 as shown in FIG. 5A and FIG. 5B. In the example, distances between marks P1m to P7m in the mirror-image mark 11m correspond to distances between marks P1 to P7 in the specific mark 11. Accordingly, when distances between marks are merely compared between the specific mark 11 and the mirror-image mark 11m, there is a possibility that the mirror-image mark 11m is mistakenly determined as the specific mark 11.

However, the problem is solved by the vector-product calculating means 41 as described below.

First, in the discrimination means 40, a vector product P of the specific mark 11 has been calculated in advance by using a first vector V1 directed from the mark P1 to the mark P2 in the specific mark 11 and a second vector V2 directed from the mark P1 to the mark P3 (refer to a formula 1 of FIG. 5C).

When discrimination processing of the discrimination means 40 is performed, the vector-product calculating means 41 extracts, for example, the marks P1m, P2m and P3m from the mirror-image mark 11m. Next, a vector product Pm is calculated by using a first vector V1m directed from the mark P1m to the mark P2m and a second vector V2m directed from the mark P1m to the mark P3m (refer to a formula 2 of FIG. 5C). The discrimination means 40 compares the vector product Pm to the vector product "P" of the specific mark 11. Since the mirror-image mark 11m has a mirror-image relationship with the specific mark 11, the vector product Pm has the same size as the vector product "P" of the specific mark 11, but signs of these products are opposite (refer to a formula 3 of FIG. 5C). As a result, since the vector product Pm does not correspond to the vector product "P", the discrimination means 40 can correctly determine that the mirror-image mark 11m has a mirror-image relationship with the specific mark 11.

On the other hand, when distances between extracted marks correspond to distances between marks P1 to P7 of the specific mark 11 as well as when a vector product calculated with respect to marks corresponding to marks the specific marks P1, P2 and P3 in the extracted mark by the vector-product calculating means 41 correspond to the vector product "P" of the specific mark 11, the discrimination means 40 can determine that there is not a mirror-image relationship between positions of the extracted mark and the specific mark 11 and that there is the specific mark 11 in the image information 18.

As described above, the discrimination means 40 is capable of determining whether there is the specific image 11 in image information 18 or not.

As shown in FIG. 5A, as an angle between the first vector V1 and the second vector V2 used for calculation of the vector product, an angle is selected, which is closer to 90 degrees compared with angles between other vectors. As the marks P1, P2 and P3 of the specific mark 11 used for calculation of the vector product, marks are selected, in which the distances between the marks P1 and P2 and the distance between the marks P1 and P3 are relatively longer as compared with distances between other marks. Accordingly, since the vector product "P" of the specific mark 11 can be set to be large, the image recognition device 100 can further improve determination accuracy.

Now, discrimination processing performed by the discrimination means 40 will be explained in more detail by using a flowchart shown in FIG. 6 to FIG. 10B.

Figure 6:
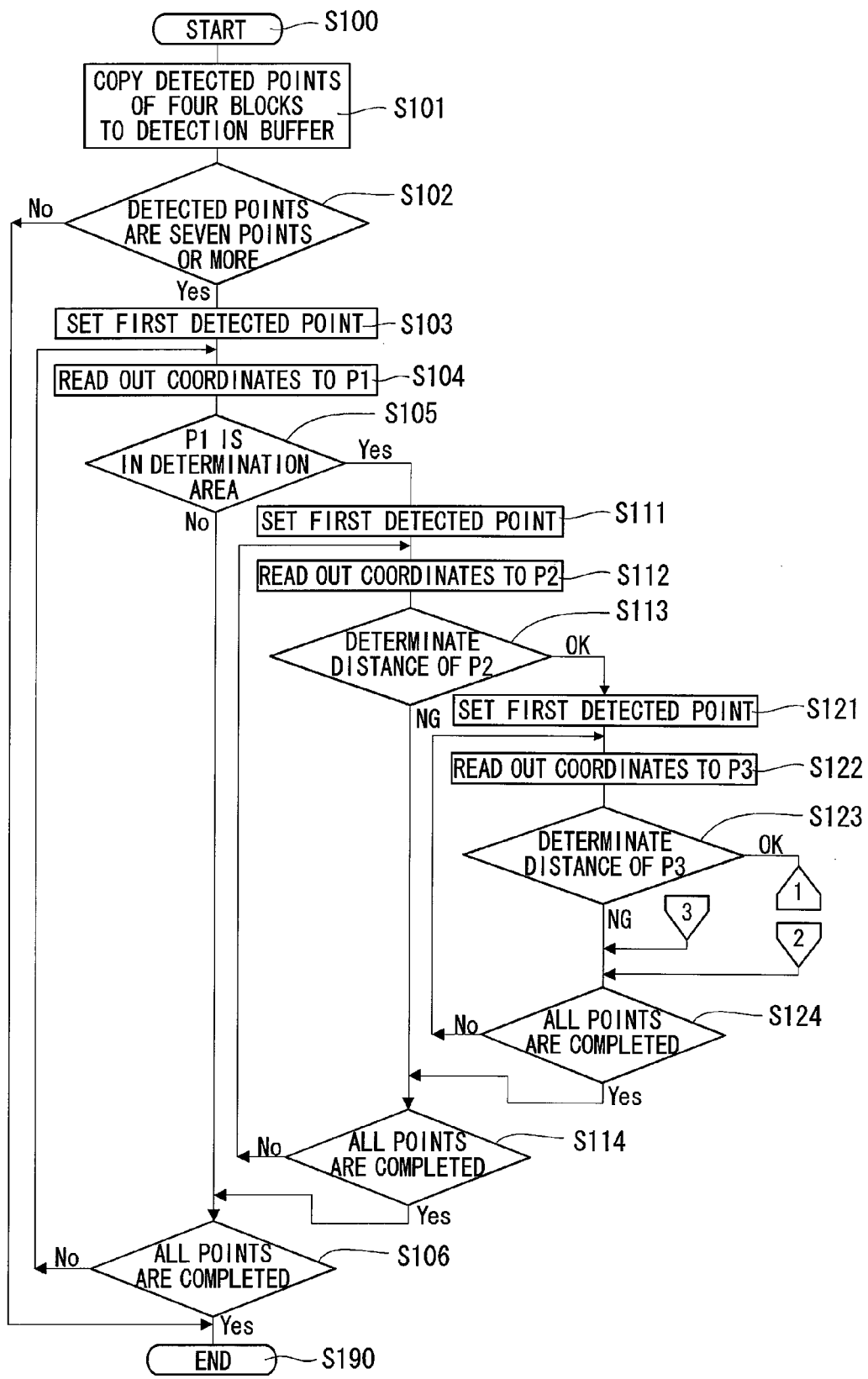
FIG. 6 relates to the image recognition device according to the embodiment, which is a flowchart showing discrimination processing performed by a discrimination means.

First, as shown in FIG. 6, discrimination processing by the discrimination means 40 is started in Step S100.

Next, in Step S101, detected points in the detected points M1 to Mn of marks extracted by the extraction means 30 which are in 2×2 blocks selected by the block dividing means 35 are copied in a detection buffer. In this case, the detected points copied in the detection buffer are denoted as S1 to St ("t" is the number of detected points copied in the detection buffer).

Next, in Step S102, when the number of detected points S1 to St is less than seven points, it is less than the number of the marks P1 to P7 of the specific mark 11, therefore, the discrimination means 40 determines that there is not the specific mark 11 in the selected four blocks, proceeding to Step S190 to end the discrimination processing in the four blocks. Then, the block dividing means 35 selects a next four blocks and the same processing is repeated to the remaining blocks. When the same processing is completed with respect to all blocks, the discrimination processing by the discrimination means 40 completely ends. After that, the recording unit 60 is notified that there is not the specific mark 11 in the image information 18.

Figure 11:
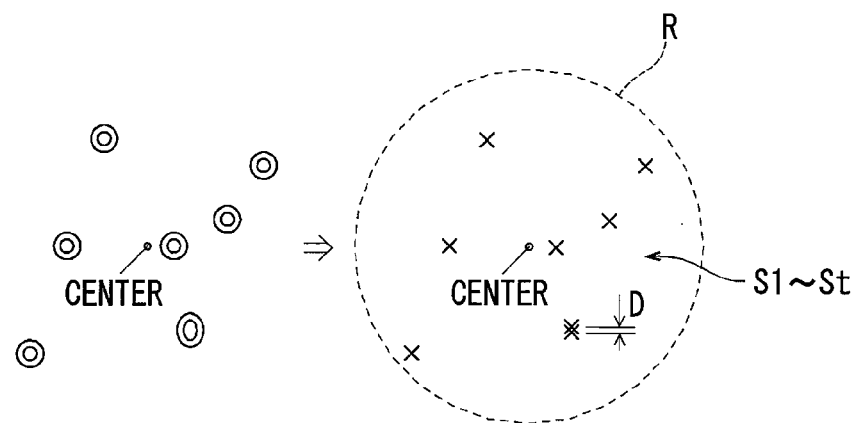
FIG. 11 relates to the image recognition device according to the embodiment, which is an explanatory view showing a specific example of detected points discriminated by the discrimination means.

On the other hand, in Step S102, when the number of detected points S1 to St is seven points or more, the number is equal or more than the number of marks P1 to P7 of the specific mark 11, therefore, the discrimination processing is continued. The reason why the processing is continued even when the number is more than eight and exceeds the number of marks P1 to P7 of the specific mark 11 is for responding to a case that a mark happen to exist in the vicinity, or a case that any of marks P1 to P7 of the specific mark 11 is read distortedly such as the mark F4 shown in FIG. 2A due to error and the like of the image reading means 20, and the mark is detected as overlapping detected points (explained in Step S171 to S182) as shown in FIG. 11.

Next, in Step S103, a first detected point is set from the detected points S1 to St.

Next, in Step S104, coordinate of the set detected point is read out on the assumption that the point corresponds to the mark P1.

Next, in Step S105, when the detection point which is assumed to correspond to the mark P1 is in the central frame "W" in the four blocks, the process proceeds to Step S111.

On the other hand, when the detected point assumed to be correspond to the mark P1 is not in the central frame "W" in the four blocks, the process proceeds to Step S106 to avoid overlapping processing. In Step S106, when Step S104 and S105 are completed with respect to all the detected points S1 to St, the process proceeds to Step S190. The processing in Step S190 is the same as described above.

In Step S106, when Step S104 and S105 are not completed with respect to all the detected points S1 to St, the process returns to Step S104, and coordinates of a next detected point is read out on the assumption that the point correspond to the mark P1.

Next, in Step S111, a first detected point is set from the detected points S1 to St.

Next, in Step S112, coordinates of the set detected point is read out on the assumption that the point correspond to the mark P2.

Next, In Step S113 (shown in Step S21 in FIG. 9A in detail), whether the distance between the detected point assumed to correspond to the mark P2 and the detected point previously assumed to correspond to the mark P1 corresponds to the distance between the mark P1 and the mark P2 in the specific mark 11 or not is determined. In the embodiment, cases that the distances correspond to each other include cases including acceptable errors to a certain degree. That is because there are effects of errors of the image reading means 20 and errors when the extraction means 30 determines coordinates of detected points M1 to Mn.

In Step S113, an affirmative result is obtained, the process proceeds to Step S121.

On the other hand, a negative result is obtained in Step S113, the process proceeds to Step S114. In Step S114, when Step S112 and S113 are completed with respect to all the detected points S1 to St, the process proceeds to Step S106. The processing in Step S106 is the same as the above.

In Step S114, when Step S112 and S113 are not completed with respect to all detected points S1 to St, the process returns to Step S112 and coordinates of a next detected point is read out on the assumption that the point correspond to the mark P2.

Next, in Step S121, a first detected point is set from detected points S1 to St.

Next, in Step S122, coordinates of the set detected points is read out on the assumption that the point correspond to the mark P3.

Next, in Step S123 (shown in Steps S31, S32 in FIG. 9B in detail), whether distances between the detected point assumed to correspond to the mark P3 and the detected points previously assumed to correspond to the marks P2, P1 correspond to distances between the mark P3 and marks P2, P1 of the specific mark 11 or not is determined. In Step S123, when an affirmative result is obtained, the process proceeds to step S131 shown in FIG. 7.

On the other hand, in Step S123, when a negative result is obtained, the process proceeds to Step S124. In Step S124, when the Steps S122 and S123 are completed with respect to all the detection points S1 to St, the process proceeds to Step S114. The processing in Step S114 is the same as the above.

In Step S124, when the Steps S122 and S123 are not completed with respect to all the detected points S1 to St, the process returns to Step S122 and coordinates of a next detected point is read out on the assumption that the point corresponds to the mark P3.

Figure 7:
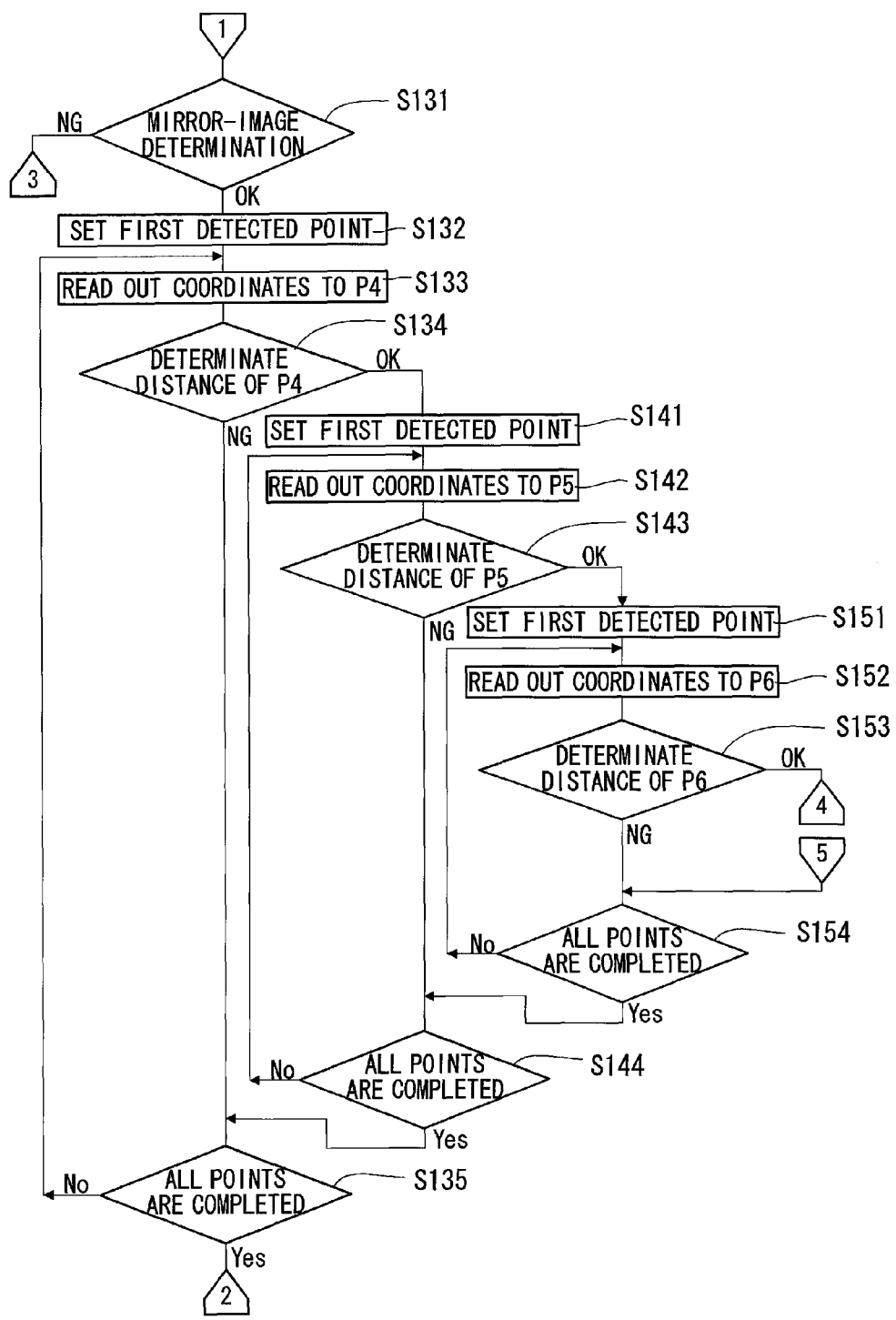
FIG. 7 relates to the image recognition device according to the embodiment, which is a flowchart showing discrimination processing performed by the discrimination means.

Next, in Step S131 shown in FIG. 7, a mirror-image determination is performed. Specifically, a vector product between the first vector directed from the detected point assumed to corresponds to the mark P1 to the detected point assumed to correspond to the mark P2 and the second vector directed from the detected point assumed to correspond to the mark P1 to the detected point assumed to correspond to the mark P3 is calculated by the vector-product calculating means 41. When the calculated vector product corresponds to the vector product "P" of the specific mark 11, the process proceeds to Step S132. In the embodiment, cases that the vector product corresponds include cases including acceptable errors to a certain degree. In the case that the mark is the mirror-image, the sign is merely different as shown in the formula 3 of FIG. 5C, therefore, when the sign corresponds to each other, it can be regarded that the vector product corresponds to each other.

On the other hand, when the calculated vector product does not correspond to the vector product "P" of the specific mark 11, it is not necessary to continue the processing with respect to the rest of the detected points S1 to St, and the process proceeds to Step S124. The processing in Step S124 is the same as the above.

Next, in Step S132, a first detected point is set from the detected points S1 to St.

Next, in Step S133, coordinates of the set detected point is read out on the assumption that the point corresponds to the mark P4.

Next, in Step S134 (shown in Steps S41, S42, and S43 of FIG. 9C in detail), whether distances between the detected point assumed to correspond to the mark P4 and detected points previously assumed to correspond to marks P3, P2 and P1 correspond to distances between the mark P4 and marks P3, P2 and P1 of the specific mark 11 or not is determined. In Step S134, when an affirmative result is obtained, the process proceeds to Step S141.

On the other hand, in Step S134, when a negative result is obtained, the process proceeds to Step S135. In Step S135, the Steps S133 and 134 are completed with respect to all the detection points S1 to St, the process proceeds to Step S124. The process in Step S124 is the same as the above.

In Step S134, Step S133 and 134 are not completed with respect to all the detected points S1 to St, the process returns to Step S133, and coordinates of a next detected point is read out on the assumption that the point corresponds to the mark P4.

Next, in Step S141, a first detected point is set from the detected points S1 to St.

Next, in Step S142, coordinate of the set detected point is read out on the assumption that the point corresponds to the mark P5.

Next, in Step S143 (shown in Steps S51, S52, S53 and S54 of FIG. 9D in detail), whether distances between the detected point assumed to correspond to the mark P5 and detected points previously assumed to correspond to marks P4, P3, P2 and P1 correspond to distances between the mark P5 and the marks P4, P3, P2 and P1 in the specific mark 11 or not is determined. In Step S143, when an affirmative result is obtained, the process proceeds to Step S151.

On the other hand, in Step S143, when a negative result is obtained, the process proceeds to Step S144. In Step S144, when Steps S142 and S143 are completed with respect to all the detected points S1 to St, the process proceeds to Step S135. The processing in Step S135 is the same as the above.

In Step S144, when Steps S142 and S143 are not completed with respect to all the detected points S1 to St, the process returns to Step S142 and coordinates of a next detected point is read out on the assumption that the point corresponds to the mark P5.

Next, in Step S151, a first detected point is set from the detected points S1 to St.

Next, in Step S152, coordinates of the set detected point is read out on the assumption that the point corresponds to the mark P6.

Next, in Step S153 (shown in Steps S61, S62, S63, S64 and S65 of FIG. 10A in detail), whether distances between the detected point assumed to correspond to mark P6 and detected points previously assumed to correspond to the mark P5, P4, P3, P2 and P1 correspond to distances between the mark P6 and the marks P5, P4, P3, P2 and P1 in the specific mark 11 or not is determined. In Step S153, when an affirmative result is obtained, the process proceeds to Step S161 shown in FIG. 8.

On the other hand, when a negative result is obtained in Step S153, the process proceeds to Step S154. In Step S154, when Steps S152 and S153 are completed with respect to all the detected points S1 to St, the process proceeds to Step S144. The processing in Step S144 is the same as the above.

In Step S154, when Steps S152 and S153 are not completed with respect to all the detected points S1 to St, the process returns to Step S152 and coordinates of a next detected point is read out on the assumption that the point corresponds to the mark P6.

Figure 8:
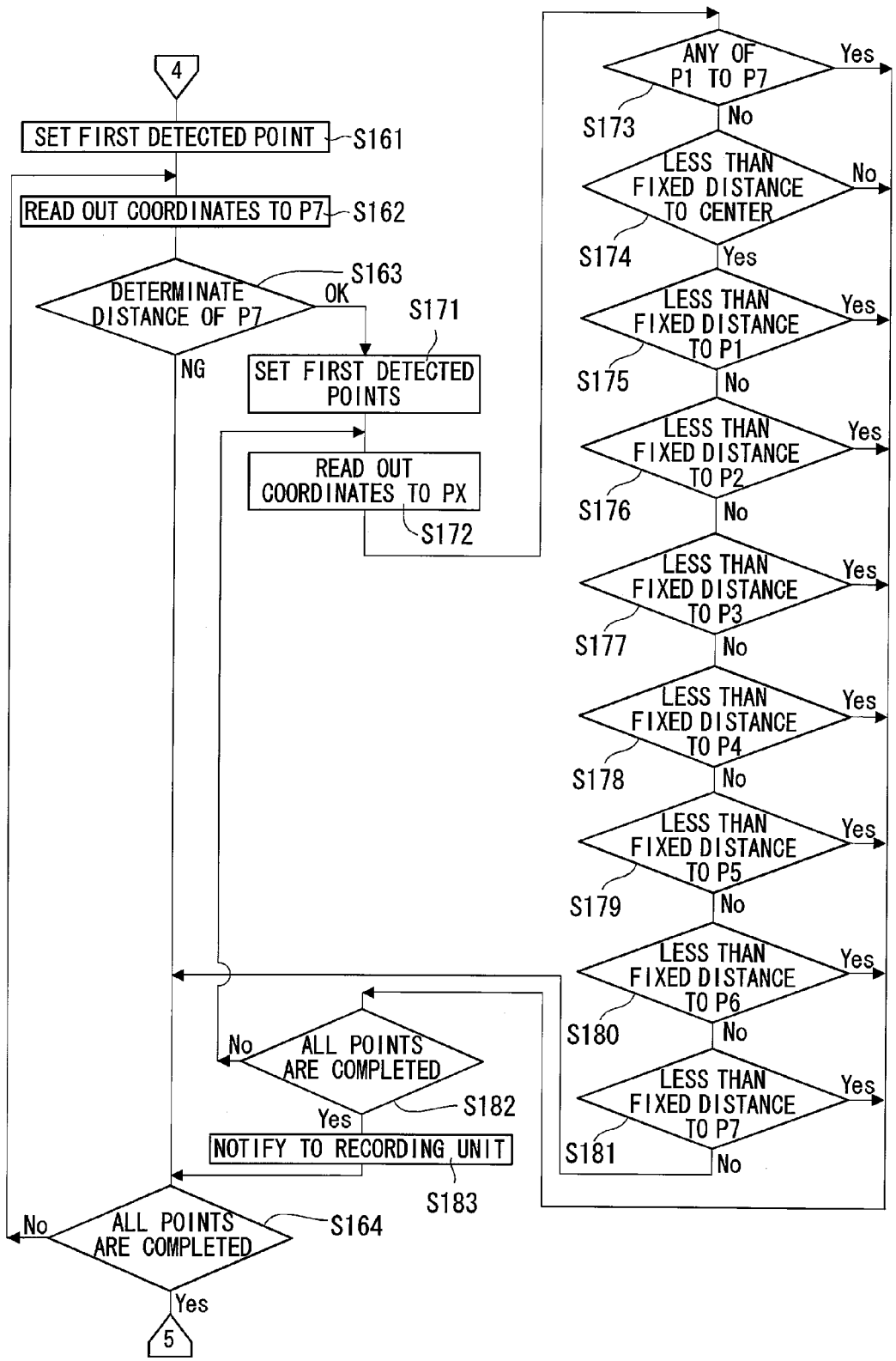
FIG. 8 relates to the image recognition device according to the embodiment, which is a flowchart showing discrimination processing performed by the discrimination means.
Figure 9A:
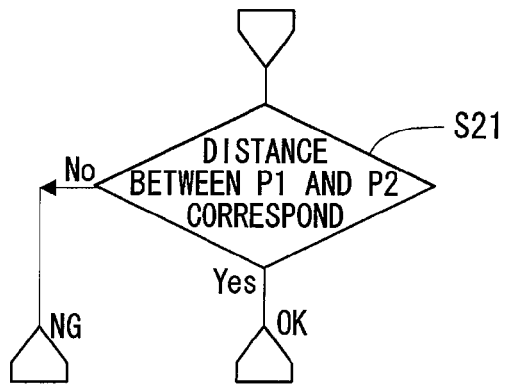
FIG. 9A to FIG. 9D relate to the image recognition device according to the embodiment, which are flowcharts showing discrimination processing performed by the discrimination means.
Figure 9B:
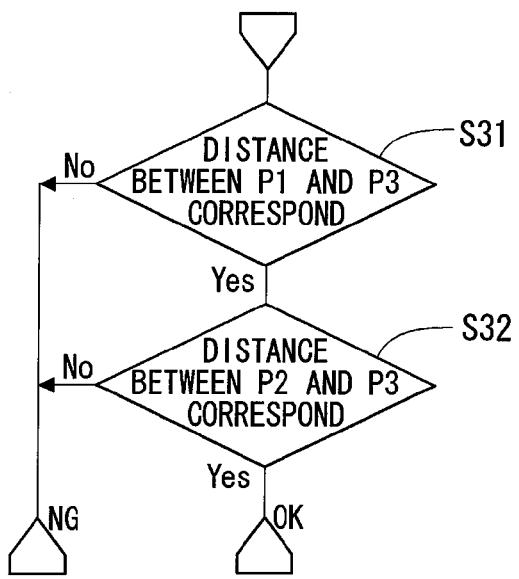
Figure 9C:
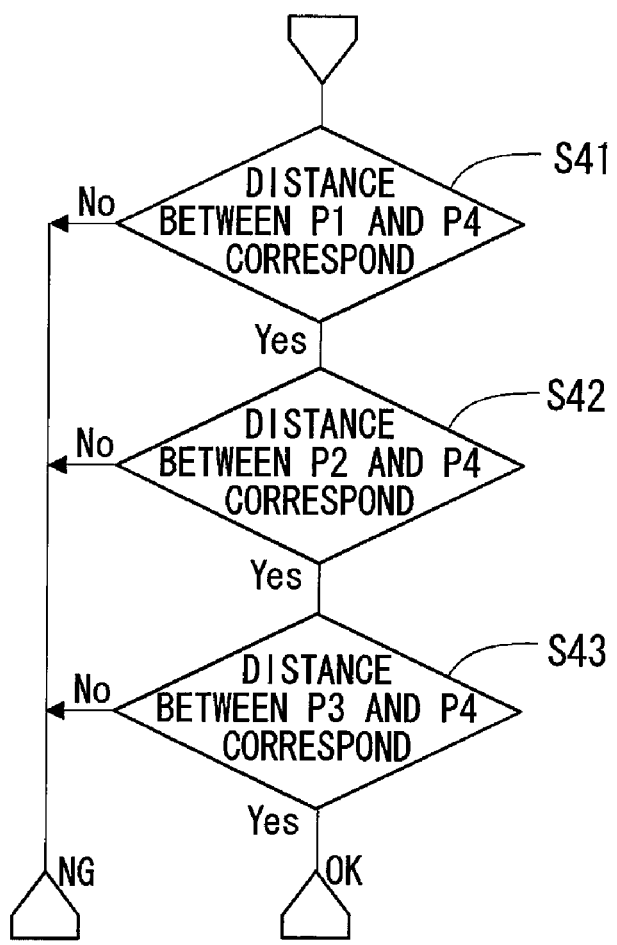
Figure 9D:
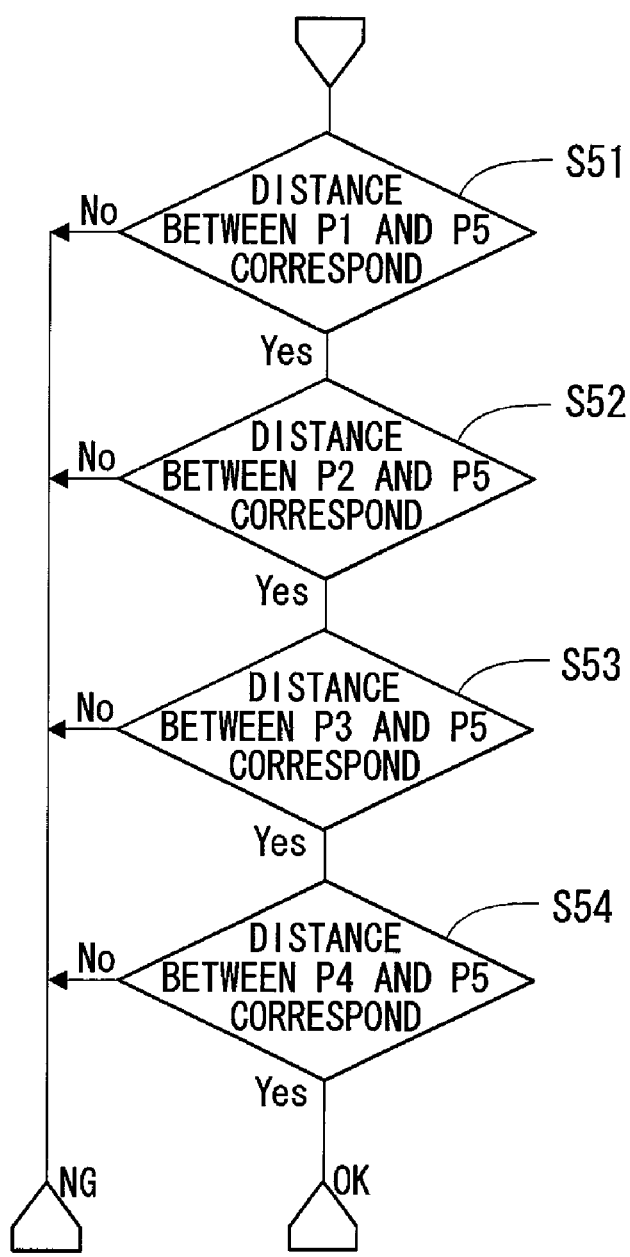
Figure 10A:
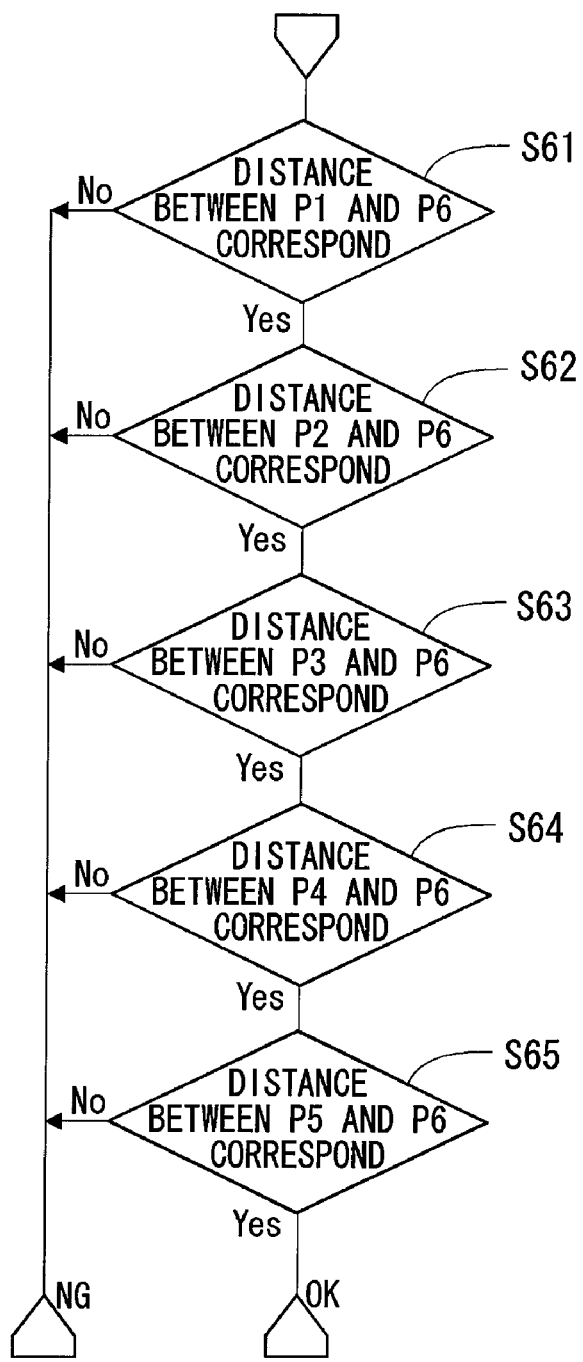
FIG. 10A and FIG. 10B relate to the image recognition device according to the embodiment, which are flowcharts showing discrimination processing performed by the discrimination means.
Figure 10B:
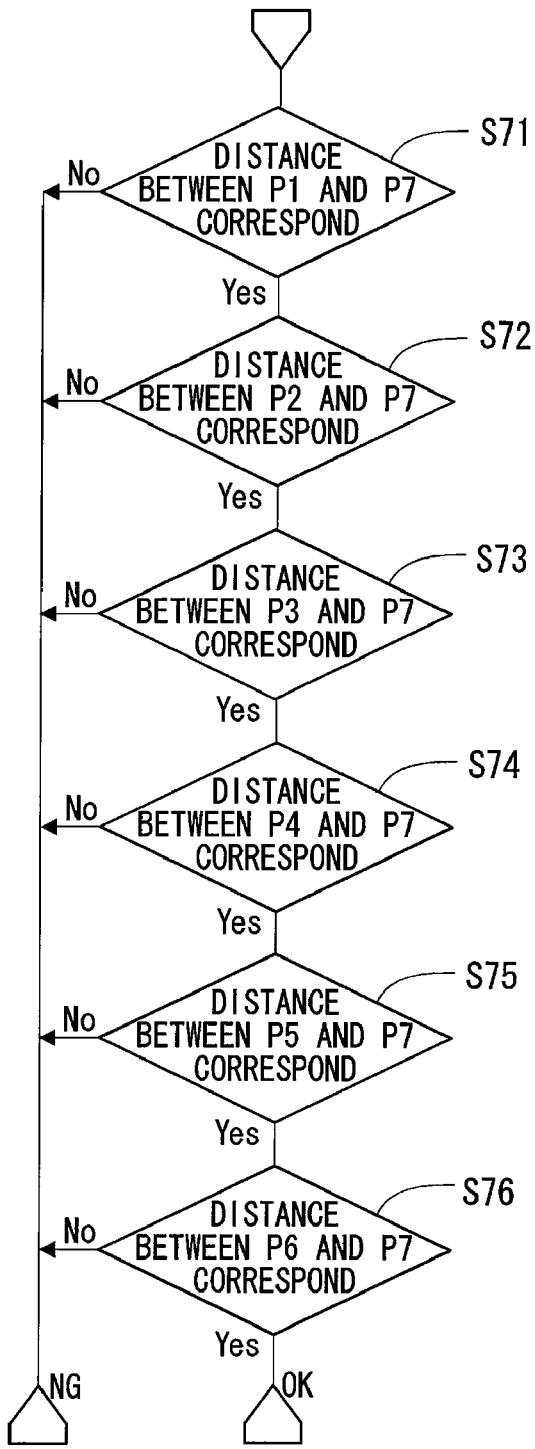

Next in Step S161 shown in FIG. 8, a first detected point is set from the detected points S1 to St.

Next, in Step S162, coordinates of the set detected point is read out on the assumption that the point corresponds to the mark P7.

Next, in Step S163 (shown in Step S71, S72, S73, S74, S75, and S76 in FIG. 10B in detail), whether distances between the detected point assumed to correspond to the mark P7 and the detected points previously assumed to correspond to marks P6, P5, P4, P3, P2 and P1 correspond to distances between the mark P7 and marks P6, P5, P4, P3, P2 and P1 in the specific mark 11 or not is determined. In Step S163, an affirmative result is obtained, the process proceeds to Step S171.

On the other hand, in Step S163, a negative result is obtained, the process proceeds to Step S164. In Step S164, Step S162 and S163 are completed with respect to all the detected points S1 to St, the process proceed to Step S154. The processing in Step S154 is the same as the above.

When Step S162, S163 are not completed with respect to all the detected points S1 to St in Step S164, the process returns to Step S162 and coordinates of a next detected point is read out on the assumption that the point corresponds to the mark P7.

Next, in Step S171, a first detected point is set from the detected points S1 to St.

Next, in Step S172, coordinates of the set detected point is read out on the assumption that the point corresponds to any overlapping detection mark PX of the marks P1 to P7.

Next in Step S173, when the detected point assumed to correspond to the overlapping detection mark PX is any of the marks P1 to P7, the process proceeds to Step S182. In Step S182, when Steps S172 to S181 are completed with respect to all the detected points S1 to St, the process proceeds to Step S183. In Step S183, the determination result that there is the specific mark 11 in the image information 18 is notified to the recording unit 60, then, the process proceeds to Step S164. The processing in Step S164 is the same as the above.

In Step S182, when Steps S172 to S181 are not completed with respect to all the detected points S1 to St, the process returns to Step S172 and coordinates of a next detected point is read out on the assumption that the point correspond to the mark PX.

On the other hand, in Step S173, when the detected point assumed to correspond to the overlapping detected mark PX is not any of the marks P1 to P7, the process proceeds to Step S174.

Next, in Step S174, when the distance between the detected point assumed to correspond to the overlapping detected mark PX and the center of detected points previously assumed to correspond to the marks P1 to P7 is not less than a fixed distance (namely, the point is at the outside of a dashed line circle "R" shown in FIG. 11), the process proceeds to Step S182. The processing in Step S182 is the same as the above. The dashed-line circle "R" is set for excluding marks departing from the specific mark 11 to such a degree that the marks have no relationship with the specific mark 11, which are around the specific mark 11.

On the other hand, in Step S174, when the distance between the detected point assumed to correspond to the overlapping detected mark PX and the center of detected points assumed to correspond to the marks P1 to P7 is less than a fixed distance (namely, the point is inside the dashed line circle "R" shown in FIG. 11), the process proceeds to Step S175.

Next, in Step S175, when the distance between the detected point assumed to correspond to the overlapping detected mark PX and the detected point previously assumed to correspond to the mark P1 is less than a fixed distance "D", the detected point is determined as an overlapping detected point, then, the process proceeds to Step S182. The fixed distance "D" is a threshold value appropriately set for determining the overlapping detected point. For example, as shown in FIG. 11, two detected points whose distance therebetween is less than the fixed distance "D" are determined as the overlapping detected point, which prevents the determination from being omitted. The processing in Step S182 is the same as the above.

On the other hand, in Step S175, when the distance between the detected point assumed to correspond to the overlapping detected mark PX and the detected point previously assumed to correspond to the mark P1 is more than the fixed distance "D", the process proceeds to Step S176.

Next, in Step S176, when the distance between the detected point assumed to correspond to the overlapping detected mark PX and the detected point previously assumed to correspond to the mark P2 is less than the fixed distance "D", the detected point is determined as an overlapping detected point, then, the process proceeds to Step S182. The processing in Step S182 is the same as the above.

On the other hand, in Step S176, when the distance between the detected point assumed to correspond to the overlapping detected mark PX and the detected point previously assumed to correspond to the mark P2 is more than the fixed distance "D", the process proceeds to Step S177.

Next, in Step S177, when the distance between the detected point assumed to correspond to the overlapping detected mark PX and the detected point previously assumed to correspond to the mark P3 is less than the fixed distance "D", the detected point is determined as an overlapping detected point, then, the process proceeds to Step S182. The processing in Step S182 is the same as the above.

On the other hand, in Step S177, when the distance between the detected point assumed to correspond to the overlapping detected mark PX and the detected point previously assumed to correspond to the mark P3 is more than the fixed distance "D", the process proceeds to Step S178.

Next, in Step S178, when the distance between the detected point assumed to correspond to the overlapping detected mark PX and the detected point previously assumed to correspond to the mark P4 is less than the fixed distance "D", the detected point is determined as an overlapping detected point, then, the process proceeds to Step S182. The processing in Step S182 is the same as the above.

On the other hand, in Step S178, when the distance between the detected point assumed to correspond to the overlapping detected mark PX and the detected point previously assumed to correspond to the mark P4 is more than the fixed distance "D", the process proceeds to Step S179.

Next, in Step S179, when the distance between the detected point assumed to correspond to the overlapping detected mark PX and the detected point previously assumed to correspond to the mark P5 is less than the fixed distance "D", the detected point is determined as an overlapping detected point, then, the process proceeds to Step S182. The processing in Step S182 is the same as the above.

On the other hand, in Step S179, when the distance between the detected point assumed to correspond to the overlapping detected mark PX and the detected point previously assumed to correspond to the mark P5 is more than the fixed distance "D", the process proceeds to Step S180.

Next, in Step S180, when the distance between the detected point assumed to correspond to the overlapping detected mark PX and the detected point previously assumed to correspond to the mark P6 is less than the fixed distance "D", the detected point is determined as an overlapping detected point, then, the process proceeds to Step S182. The processing in Step S182 is the same as the above.

On the other hand, in Step S180, when the distance between the detected point assumed to correspond to the overlapping detected mark PX and the detected point previously assumed to correspond to the mark P6 is more than the fixed distance "D", the process proceeds to Step S181.

Next, in Step S181, when the distance between the detected point assumed to correspond to the overlapping detected mark PX and the detected point previously assumed to correspond to the mark P7 is less than the fixed distance "D", the detected point is determined as an overlapping detected point, then, the process proceeds to Step S182. The processing in Step S182 is the same as the above.

On the other hand, in Step S181, when the distance between the detected point assumed to correspond to the overlapping detected mark PX and the detected point previously assumed to correspond to the mark P7 is more than the fixed distance "D", the process proceeds to Step S164. The processing in Step S164 is the same as the above.

As described above, the discrimination means 40 determines that there is the specific mark 11 in the image information 18 only when reaching Step S183 in the above flowchart, and notifies the determination to the recording unit 60. On the other hand, when the process does not reach Step S183 and finally reaches Step S190, the discrimination means 40 notifies that there is not the specific mark 11 in the image information 18 to the recording unit 60. When the recording unit 60 receives notification by Step S183, the illegal copy prevention unit 60a takes illegal copy prevention measures such as stopping output of the image information 18 to the outside.

Figure 12:
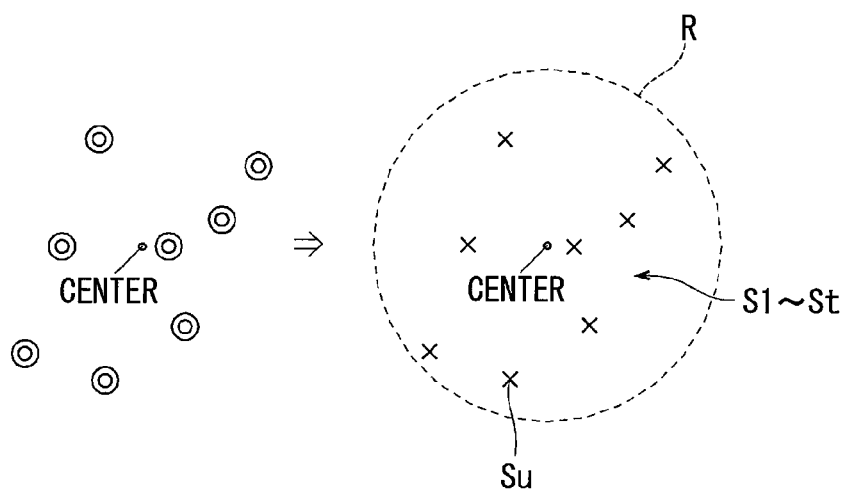
FIG. 12 relates to the image recognition device according to the embodiment, which is an explanatory view showing a specific example of detected points discriminated by the discrimination means.
Figure 13:
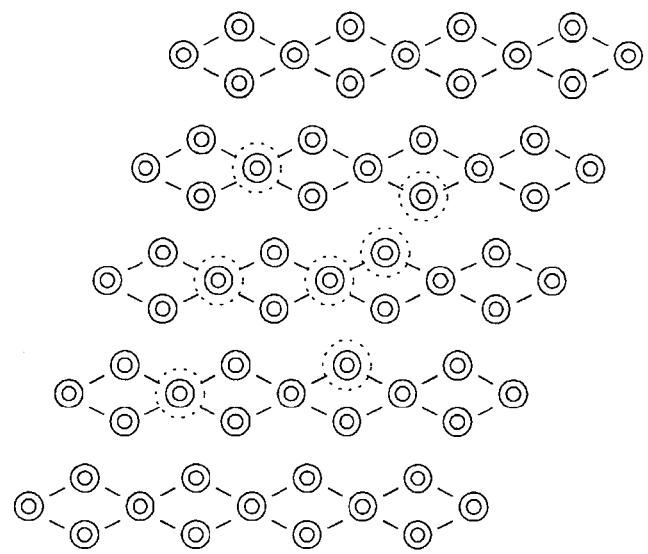
FIG. 13 relates to the image recognition device according to the embodiment, which is an explanatory view showing a pattern arranged regularly including marks which may be confused with the specific mark.

Here, determination examples by the discrimination means 40 will be introduced. For example, as shown in FIG. 12, in the case that a detected point "Su" exists in the dashed-line circle "R" as a superfluous detected point in the detected points S1 to St, a negative result is obtained in Step S173, an affirmative result is obtained in Step S174, and negative results are obtained in all Steps S175 to S181, as a result, the detected point does not reach Step S183, therefore, it is determined that there is not the specific mark 11 in the image information 18. Accordingly, as shown in FIG. 13, even in a pattern in which marks having a shape of "⊙" are regularly arranged, including misleading parts with respect to the marks P1 to P7 of the specific mark 11, it is determined that there is not the specific mark 11 in the image information 18 in the same manner.

Figure 14:
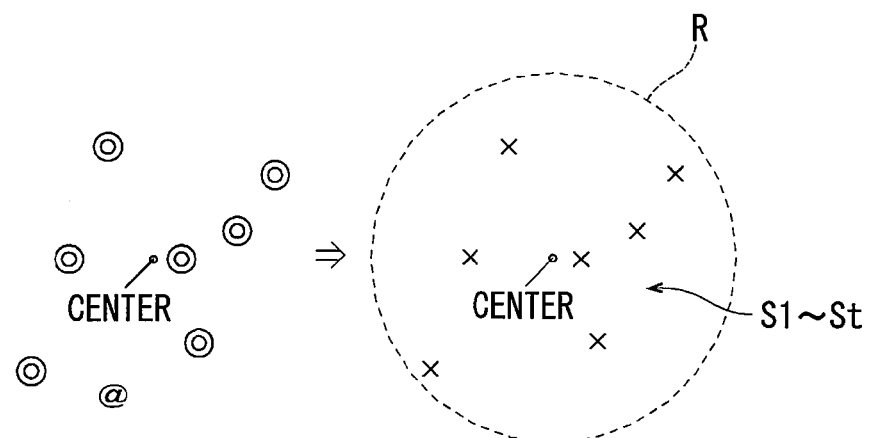
FIG. 14 is relates to the image recognition device according to the embodiment, which is an explanatory view showing a specific example of detected points discriminated by the discrimination means.

As shown in FIG. 14, when a character "@" which resembles the shape of "⊙" exists in the vicinity of the mark having the shape of "⊙", the extraction means 30 checks marks having a chromatic color as an object to be checked, therefore, the character "@" which is usually printed in black is easy to be excluded. Accordingly, the character "@" is hardly misidentified as the detected point, and determination accuracy is improved.

Figure 15:
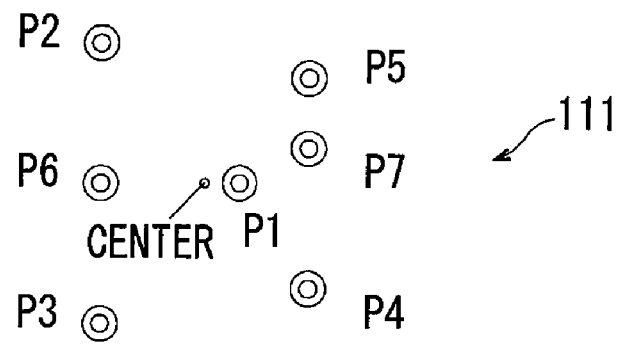
FIG. 15 is an explanatory view showing a modification example of the specific mark.
Figure 15:
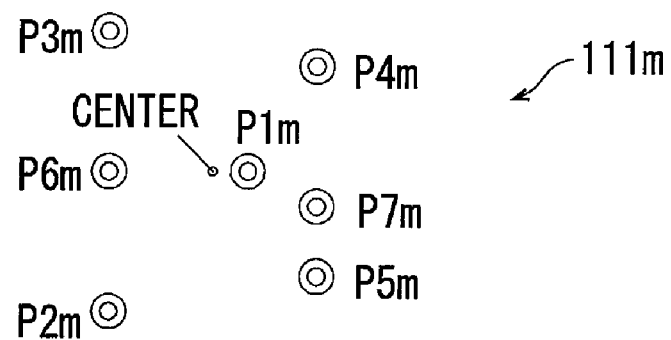

Moreover, in another specific mark 111 in which position relation of marks P1 to P7 shown in FIG. 1 is altered as shown in FIG. 15, the discrimination means 40 functions efficiently. In this case, a mirror-image mark 111m having a mirror-image relationship with the specific mark 111 has the same position relation as the specific mark 111 except P7 and P7m. In the mirror-image determination in Step S131, it is difficult to determine that the mirror-image mark 111m has a mirror-image relationship with the specific mark 111. However, in the distance determination of P7 in Step S163, a negative result is obtained after all, therefore, the mirror-image mark 111m is not determined to be the specific mark 111.

The image recognition device 100 having the above configuration can output image information 18 recorded in the recording unit 60 to the outside. For example, a copy apparatus which received the image information 18 can perform printing based on the image information 18 by a printing means. The image recognition device 100 is also capable of prevent illegal copying by discriminating the specific mark 11 included in the image information 18 of the manuscript 19 such as a banknote or a classified document.

In the image recognition device 100 of the embodiment, the discrimination means 40 determines whether distances between the extracted marks correspond to the distances between marks P1 to P7 of the specific mark 11 or not, as well as determines whether there is a mirror-image relationship between positions of the extracted marks and the specific mark 11 or not.

Accordingly, the discrimination means 40 can determine that there is the specific mark 11 in the image information 18 when distances between marks correspond to marks P1 to P7 of the specific mark 11 as well as when there is not a mirror-image relationship between positions of the extracted marks and the specific mark 11. On the other hand, the discrimination means 40 can determine that there is not the specific mark 11 in the image information 18 when distances between marks do not correspond to distances between marks P1 to P7 of the specific mark 11. Furthermore, the discrimination means 40 can determine that there is not the specific mark 11 in the image information 18 when there is a mirror-image relationship between positions of the extracted marks and the specific mark 11 though distances between marks correspond to distances between marks P1 to P7 of the specific mark 11.

Accordingly, in the image recognition device 100, a situation that the device mistakenly determined that there is the specific mark 11 in the image information 18 hardly occur, and mistaken determination can be reduced as compared with the conventional image recognition device which merely compares distances between extracted marks and distances between marks P1 to P7 of the specific mark 11.

Therefore, the image recognition device 100 of the embodiment can improve the determination accuracy for image recognition.

Also, in the image recognition device 100, the discrimination means 40 includes the vector-product calculating means 41 and determines that there is not a mirror-image relationship between positions of marks and the specific mark 11 when distances between the extracted marks correspond to distances between marks P1 to P7 of the specific mark 11 as well as when the vector product corresponds to the vector product "P" of the specific mark 11. According to the specific configuration, the image recognition means 100 can easily determine whether there is a mirror-image relationship between positions of the extraction marks and the specific mark 11 or not, which reduces the mistaken determination positively.

Moreover, in the image recognition device 100, as an angle between the first vector V1 and the second vector V2 used for calculation of the vector product, an angle is selected, which is closer to 90 degrees as compared with angles between other vectors. Therefore, the image recognition device 100 can set the vector product "P" between the first vector V1 and the second vector V2 to be large, which improve the determination accuracy.

In the image recognition device 100, as the marks P1, P2 and P3 of the specific mark 11 used for calculation of the vector product, marks are selected, in which the distance between the marks P1 and P2 and the distance between the marks P1 and P3 are relatively longer as compared with distances between other marks. Accordingly, since the vector product "P" between the first vector V1 and the second vector V2 can be set to be large, the image recognition device 100 can further improve determination accuracy.

Furthermore, in the image recognition device 100, the discrimination means 40 compares the vector product calculated by the vector-product calculating means 41 to the vector product "P" of the specific mark 11 in the mirror-image determination in Step S131, while comparing distances between the extracted marks and distances between marks P1 to P7 of the specific mark 11. When the vector product does not corresponds to the vector product "P" of the specific mark 11, the discrimination means 40 stops processing after that and returns to the previous step. Since the image recognition device 100 can omit unnecessary discrimination processing, time required for image recognition can be shortened.

In the image recognition device 100, the extraction means 30 takes marks having a chromatic color as a determination object. This is because the specific mark 11 has a chromatic color rather than achromatic colors such as black, gray and the like in many cases. Accordingly, the image recognition device 100 can appropriately exclude unnecessary marks.

In the image recognition device 100, the extraction means 30 determines a position of the mark by extracting a peak value of the similarity obtained by checking the extracted mark with the reference mark "T" by the peak value detecting unit 32. Accordingly, the image recognition device 100 excludes misleading information and determines positions of marks accurately, which improves the determination accuracy.

In the image recognition device 100, the extraction means 30 performs smoothing processing to image information 18 in advance by the filtering unit 73. Since the image recognition device 100 extracts marks in which noise is removed by receiving the smoothing processing, positions of marks can be determined accurately, which improves the determination accuracy.

The invention has been explained according to the embodiment as the above. It goes without saying that the invention is not limited to the embodiment and can be applied by being modified appropriately within a scope not departing from the gist thereof.

What is claimed is:

1. An image recognition device comprising:
   an image reading means for reading image information from a document;
   an extraction means for extracting a plurality of marks included in the image information;
   a distance calculation means for calculating distances between the extracted plurality of marks; and
   a discrimination means for determining whether a specific mark, in which plural marks are arranged, exists in the image information by:
      determining that the specific mark exists in the image information upon determining that:
         the distances between the extracted plurality of marks correspond to distances between the plural marks of the specific mark, and
         a mirror-image relationship between positions of the extracted plurality of marks and the specific mark does not exist, wherein the mirror-image relationship indicates that the positions of the extracted plurality of marks correspond to positions of the plural marks of the specific mark mirrored across an axis,
   wherein the discrimination means includes a vector-product calculating means for calculating a vector product using two vectors, one vector directed from a first mark to a second mark and another vector directed from the first mark to a third mark, and
   wherein the discrimination means determines that the mirror-image relationship between positions of the extracted plurality of marks and the specific mark does not exist upon determining that the distances between the extracted plurality of marks correspond to the distances between the plural marks of the specific mark and the vector product corresponds to a vector product of the specific mark.

2. The image recognition device according to claim 1, wherein the first, second, and third marks used for calculation of the vector product are selected so that an angle between a first vector formed by the first and second marks and a second vector formed by the first and third marks is closer to 90 degrees as compared with angles between other vectors.

3. The image recognition device according to claim 1, wherein the first, second, and third marks used for calculation of the vector product are selected so that a distance between the first and second marks, and a distance between the first and third marks are relatively longer than distances between other marks.

4. The image recognition device according to claim 1, wherein the discrimination means compares the vector product between the two vectors to the vector product of the specific mark while comparing the distances between the extracted plurality of marks and the distances between the plural marks of the specific mark, and when the vector product does not correspond to the vector product of the specific mark, the discrimination means stops processing the extracted plurality of marks.

5. The image recognition device according to claim 1, wherein the extraction means takes marks having a chromatic color as a determination object.

6. The image recognition device according to claim 1, wherein the extraction means determines a position of an extracted mark by extracting a peak value of similarity between the extracted mark and a reference mark.

7. The image recognition device according to claim 1, wherein the extraction means performs smoothing processing on the image information in advance.

8. The image recognition device according to claim 1, further comprising:
a first image processing means provided downstream from the reading means, including, in order from upstream to downstream, an A/D converter, a D-range correction unit, a reading gamma correction unit, a variable magnification processing unit, a filtering unit, a masking unit, a GCR unit, a recording gamma correction unit, a binarization unit, and a recording unit; and
a second image processing means provided downstream from the position of the D-range correction unit of the first image processing means and parallel to a position extending from the reading gamma correction unit to the recording unit in the first image processing means, the second image processing means including, in order from upstream to downstream, a gamma correction unit, a variable magnification processing unit, a filtering unit, GCR unit and a monochrome unit.

9. The image recognition device according to claim 1, further comprising:
a block dividing means, provided downstream from the extraction means, for dividing the image information into a plurality of blocks along a sub-scanning direction by:
sequentially extracting two belt-shaped extraction regions along a main-scanning direction, and
dividing the two extraction regions into the plurality of blocks along the main-scanning direction,
wherein the block dividing means selects 2×2 blocks while providing overlapping portions in the main-scanning direction and the sub-scanning direction.

10. A copy apparatus, comprising:
an image recognition device including an image reading means for reading image information from a document; and
a printing means for performing printing based on the image information read by the image reading means of the image recognition device, and
wherein the image recognition device further includes:
an extraction means for extracting a plurality of marks included in the image information;
a distance calculation means for calculating distances between the extracted plurality of marks; and
a discrimination means for determining whether a specific mark in which plural marks are arranged exists in the image information by:
determining that the specific mark exists in the image information upon determining that:
the distances between the plurality of extracted marks correspond to distances between the plural marks of the specific mark, and
a mirror-image relationship between positions of the extracted plurality of marks and the specific mark does not exist, wherein the mirror-image relationship indicates that the positions of the extracted plurality of marks correspond to positions of the plural marks of the specific mark mirrored across an axis,
wherein the discrimination means includes a vector-product calculating means for calculating a vector product using two vectors, one vector directed from a first mark to a second mark and another vector directed from the first mark to a third mark, and
wherein the discrimination means determines that the mirror-image relationship between positions of the extracted plurality of marks and the specific mark does not exist upon determining that the distances between the extracted plurality of marks correspond to the distances between the plural marks of the specific mark and the vector product corresponds to a vector product of the specific mark.

11. An image recognition method comprising the steps of:
reading image information from a document;
extracting a plurality of marks included in the image information;
calculating distances between the extracted plurality of marks;
determining whether a specific mark in which plural marks are arranged exists in the image information by:
determining whether a mirror-image relationship between positions of the extracted plurality of marks and the specific mark exists, wherein the mirror-image relationship indicates that the positions of the extracted plurality of marks correspond to positions of the plural marks of the specific mark mirrored across an axis,
determining that the specific mark exists in the image information upon determining that:
the distances between the extracted plurality of marks correspond to distances between the plural marks of the specific mark, and
the mirror-image relationship between the positions of the extracted plurality of marks and the specific mark does not exist,
wherein determining whether the specific mark exists in the image formation includes calculating a vector product using two vectors, one vector directed from a first mark to a second mark and another vector directed from the first mark to a third mark, and
wherein determining that the mirror-image relationship between positions of the extracted plurality of marks and the specific mark does not exist upon determining that the distances between the extracted plurality of marks correspond to the distances between the plural marks of the specific mark and the vector product corresponds to a vector product of the specific mark.

12. An apparatus comprising:
a processor; and
memory operatively coupled to the processor and storing computer readable instructions that, when executed, cause the apparatus to:
read image information from a document;
extract a plurality of marks included in the image information;
calculate distances between the extracted plurality of marks;
determine whether a mirror-image relationship between positions of the marks and a specific mark exists, wherein the specific mark includes an arrangement of plural marks and wherein the mirror-image relationship indicates that the positions of the extracted plurality of marks correspond to positions of the plural marks of the specific mark mirrored across an axis;
determine that the specific mark exists in the image information upon determining that:
the distances between the extracted plurality of marks correspond to distances between the plural marks of the specific mark, and
the mirror-image relationship between the positions of the extracted plurality of marks and the specific mark does not exist,
wherein the determining whether the mirror-image relationship exists includes calculating a vector product using two vectors, one vector directed from a first mark to a second mark and another vector directed from the first mark to a third mark, and
wherein determining that the mirror-image relationship between positions of the extracted plurality of marks and the specific mark does not exist includes determining that the distances between the extracted plurality of marks correspond to the distances between the plural marks of the specific mark and the vector product corresponds to a vector product of the specific mark.

* * * * *